United States Patent
Rooks, Sr. et al.

(10) Patent No.: US 8,477,917 B1
(45) Date of Patent: Jul. 2, 2013

(54) SYSTEM AND METHOD FOR PROVIDING TELECOMMUNICATION SERVICES TO TRANSIENT CUSTOMERS

(75) Inventors: Kelsyn Donel Seven Rooks, Sr., Overland Park, KS (US); Erik Geldbach, Olathe, KS (US); Mark Wilmoth, Gardner, KS (US); Shane M. Smith, Paola, KS (US); Eric Lumbirt, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1101 days.

(21) Appl. No.: 12/057,263

(22) Filed: Mar. 27, 2008

(51) Int. Cl.
*H04M 15/00* (2006.01)
*H04M 3/42* (2006.01)

(52) U.S. Cl.
USPC ............ 379/114.01; 379/114.03; 379/114.12; 379/207.02

(58) Field of Classification Search
USPC ................ 379/114.01, 114.03, 114.05, 114.1
See application file for complete search history.

(56) References Cited

U.S. PATENT DOCUMENTS

| | | | | |
|---|---|---|---|---|
| 5,588,051 | A * | 12/1996 | Berkowitz et al. | 379/243 |
| 5,659,605 | A * | 8/1997 | Voit et al. | 379/243 |
| 5,844,978 | A * | 12/1998 | Reuss et al. | 379/196 |
| 6,304,641 | B1 * | 10/2001 | Culli et al. | 379/114.22 |
| 7,027,575 | B1 * | 4/2006 | Burgess | 379/201.01 |
| 7,391,855 | B2 * | 6/2008 | Winstead et al. | 379/114.21 |
| 7,831,027 | B2 * | 11/2010 | Cesarini et al. | 379/114.03 |

OTHER PUBLICATIONS

Bellsouth, "Suspend or Restore Your Telephone Service", Aug. 11, 2007, Wayback Machine, http://web.archive.org/web/20070811124253/https://ordering.bellsouth.com/apps/rnr/ordering/susprest/controller.jsp?action=launch&bcid=suspend.*

* cited by examiner

*Primary Examiner* — Rasha Al Aubaidi
*Assistant Examiner* — Nafiz E Hoque
(74) *Attorney, Agent, or Firm* — Patton Boggs LLP

(57) ABSTRACT

A system and method for providing wireline telephone services may include providing wireline telephone service to a residence for a customer to place telephone calls. In response to receiving an activate code, the wireline telephone service may be activated. In response to receiving a deactivate code, the wireline telephone service may be deactivated. The customer may be billed for the wireline telephone service. In one embodiment, the customer is billed a premium service charge when the wireline telephone service is active and a lower service charge when the wireline telephone service is inactive.

17 Claims, 3 Drawing Sheets

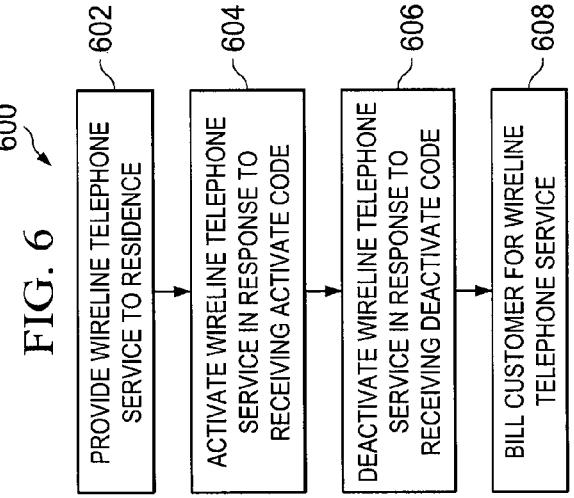
FIG. 4
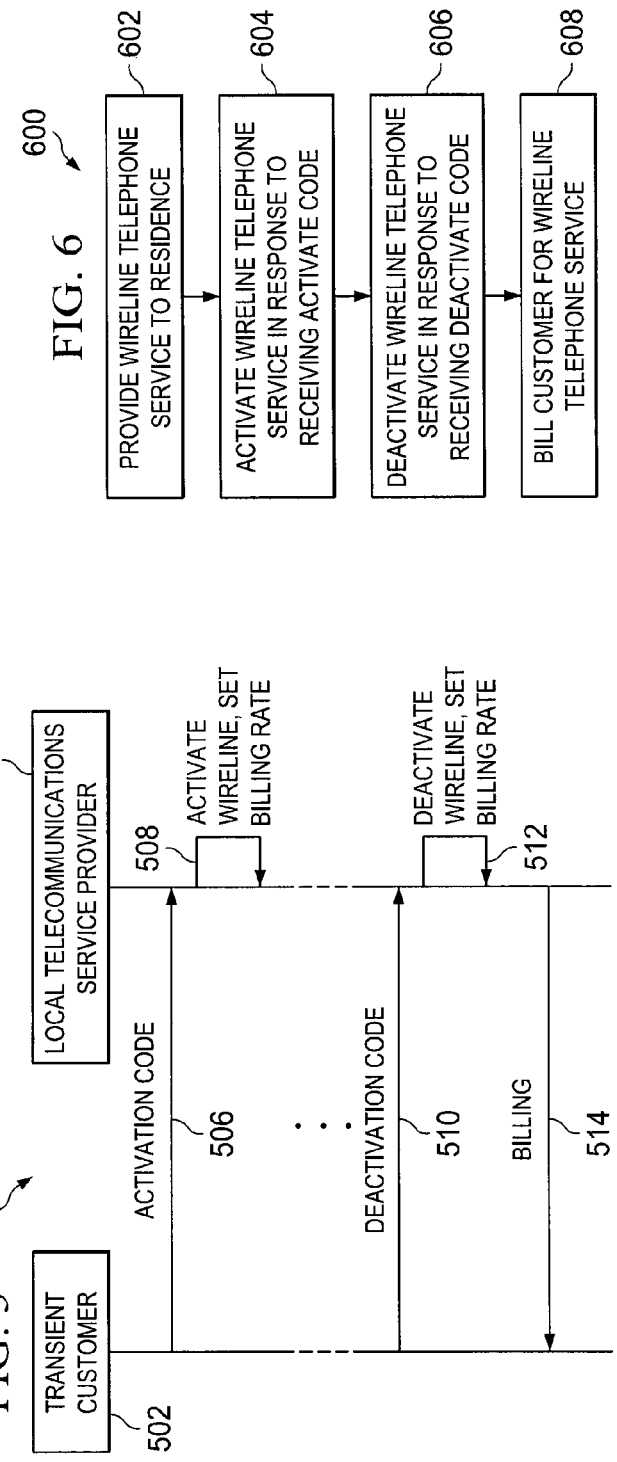
FIG. 5
FIG. 6

SYSTEM AND METHOD FOR PROVIDING TELECOMMUNICATION SERVICES TO TRANSIENT CUSTOMERS

BACKGROUND

Society has become more transient as transportation has advanced. Airline travel has enabled people to cost effectively travel across the United States and the world. Similarly, automobile and other forms of transportation have enabled people to travel locally in a very cost-effective manner. Societal wealth has also increased with advancement in technology, real estate, and other investments. Along with societal wealth increasing, transient nature of society, and ease of transportation, people own multiple homes or travel for extended periods of time.

In addition to the evolution of transportation, so too has telecommunications evolved. No longer are telecommunications limited to the public switch telephone network (PSTN). Today, consumers have mobile telephone and voice over internet protocol (VoIP) telecommunications options. In fact, many consumers have opted to use mobile telephones or VoIP telephones as their primary telecommunications option and either limited or eliminated using home wireling telephones that communicate over the PSTN.

One problem with eliminating home wireline telephone service is that, as well known, wireline telephones that are powered by the PSTN generally operate during power outages. Mobile telephones and VoIP telephones operate only as long as their batteries do. And, during a power outage, the batteries of these devices cannot be recharged.

Although consumers understand safety concerns, economic costs are also a factor when determining whether or not to maintain wireline telephone service at a residence. For transient consumers who split their time between two or more residences or travel for extended periods of time, it makes little sense to pay for home wireline telephone service when not used for extended periods of time. For example, "snowbirds" or people who travel from the north to the south or other warmer climates during the winter, often cancel their home wireline telephone service during their travels to save costs. Many snowbirds simply never resume their home telephone service even though safety concerns exist during power outages, which is problematic for both the consumers and the local telecommunications service provider. For the local telecommunications service provider, transient customers who cancel and do not resume their home wireline telephone service ultimately cost the local telecommunications service provider a lot of money and advertising revenue in the long run.

SUMMARY

To overcome the problem of transient consumers canceling wireline telephone service while traveling, the principles of the present invention provide for an alternative wireline telephone service plan to entice transient consumers to maintain their wireline telephone service. In one embodiment, a telecommunications service provider may offer a wireline telephone service plan that includes minimal service charges to maintain the wireline telephone service when inactive and premium service charges when active. To activate and deactivate the wireline telephone service, a transient customer may enter an activate and deactivate code, respectively, into the telephone. When deactivated, the wireline telephone service may enable a user to call 911 for safety purposes.

One embodiment of method for providing wireline telephone services may include providing wireline telephone service to a residence for a customer to place telephone calls. In response to receiving an activate code, the wireline telephone service may be activated. In response to receiving a deactivate code, the wireline telephone service may be deactivated. The customer may be billed for the wireline telephone service. In one embodiment, the customer is billed a premium service charge when the wireline telephone service is active and a lower service charge when the wireline telephone service is inactive.

BRIEF DESCRIPTION OF THE DRAWINGS

Illustrative embodiments of the present invention are described in detail below with reference to the attached drawing figures, which are incorporated by reference herein and wherein:

FIG. 4 is a table of exemplary data for providing wireline telephone services for transient customers;

FIG. 5 is a timing diagram of an exemplary process for enabling a transient customer to activate and deactivate wireline telephone service; and FIG. 6 is a flow diagram of an exemplary process for enabling a transient customer to activate and deactivate wireline telephone service.

DETAILED DESCRIPTION OF THE DRAWINGS

Figure 1:
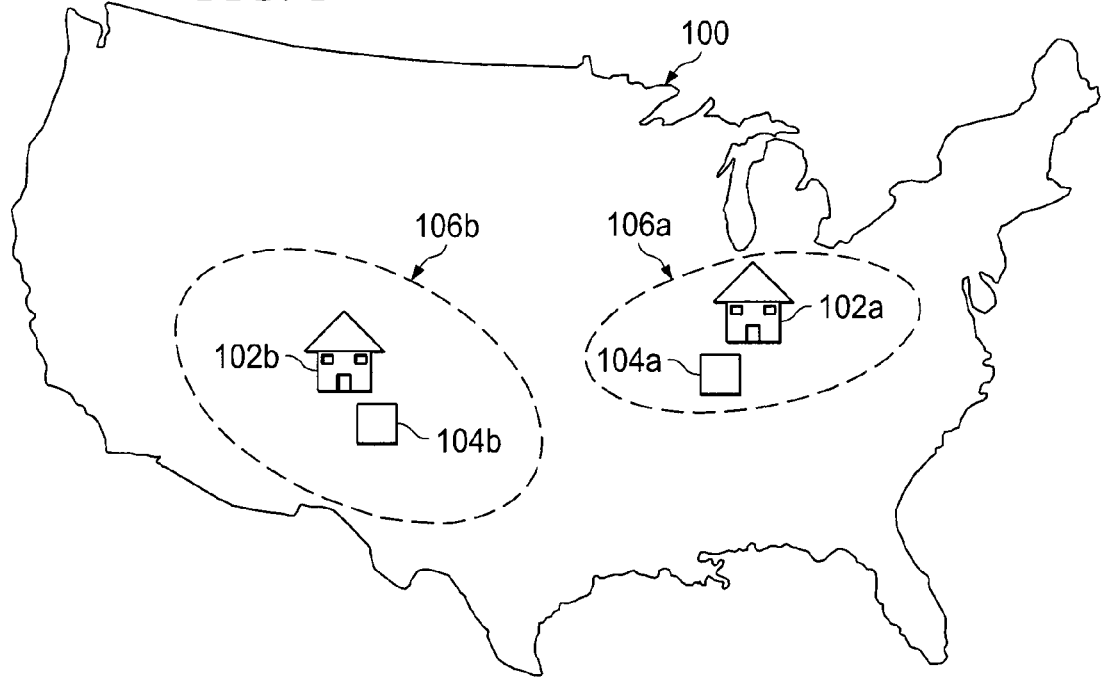
FIG. 1 is an illustration of an exemplary map of the United States showing residences being served by telecommunications service providers.

FIG. 1 is an illustration of an exemplary map 100 of the United States showing residences 102a and 102b (collectively 102) of a transient customer being served by telecommunications service providers 104a and 104b (collectively 104), respectively. Residence 102a is within a service area 106a of a first telecommunications service provider 104a, and residence 102b is within a service area 106b of a second telecommunications service provider 104b. The transient customer may reside in residence 102a during summer months and residence 102b during winter months. During the winter months, the transient customer may find that it is not particularly cost effective to be paying for wireline telephone service and elect to cancel the wireline telephone service not just for the winter months, but throughout the year and rely on mobile telephone service. Once canceled, however, the transient customer faces potential loss of telephone service during power outages due to mobile telephone battery power running out.

To satisfy the transient customer's desire to minimize costs for wireline telephone service, the principles of the present invention provide for the telecommunications service provider 104a to offer a transient wireline or local telecommunications service plan ("transient telephone plan") that has low fees during times when the wireline telephone service is inactive and premium rates when the wireline telephone service is active. For example, if normal wireline telephone service or local telephone service costs $25 per month or $300 per year, the transient telephone plan may cost $2 per month when inactive and $30 per month when active. In the event that the transient customer is away from his or her residence for six winter months, the transient customer would pay $12 for the winter months and $180 for the summer months or $192 per year, which is a savings of $108 per year (i.e., $300-$192).

It should be understood that the above rates are exemplary and that alternative rates may be utilized in accordance with the principles of the present invention. It should further be understood that the transient telephone plan may be established to charge a transient customer for a full month if the transient customer activates the wireline telephone service at anytime during the month. Alternatively, the transient telephone plan may be established to charge a transient customer on a pro rata basis for a month based on a percentage of time that the transient customer activates the wireline telephone service during the month. Still yet, the transient telephone plan may provide for fees may be based on a pro rata share of a year rather than a month. In other words, if the wireline telephone service is activated for 200 days, then the transient customer would pay a percentage defined by 200 out of 365 days. However, to prevent a customer from activating and deactivating the wireline telephone service on a daily basis, a minimum number of days, such as a week or a month may be charged each time the transient customer activates the wireline telephone service.

Figure 2:
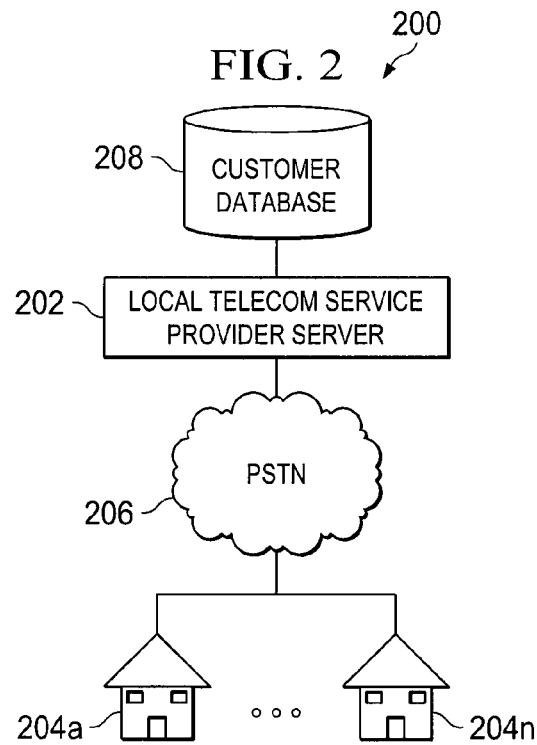
FIG. 2 is a block diagram of an exemplary network of a local telecommunications service provider servicing customers at residences.

FIG. 2 is a block diagram of an exemplary network 200 of a local telecommunications service provider servicing transient customers. The local telecommunications service provider may operate a local telecommunications service provider server 202 that is configured to communicate with telephone equipment or customer premises equipment (CPE) at residences 204a-204n (collectively 204) of customers via the PSTN 206. A customer database 208 may be in communication with the local telecommunications service provider server 202, and may be local or remotely located from the local telecommunications service provider server 202. The customer database 208 may store a variety of customer information, including name, address, telephone number, service plan, rates, activation status, or any other information that may assist a local telecommunications service provider manage wireline telephone services to customers.

A customer who has elected to have a transient telephone plan may selectively activate and deactivate the wireline telephone service by dialing one or more codes. For example, to activate and deactivate the wireline telephone service, the customer may press "*33." Alternatively, different activate and deactivate codes may be utilized (e.g., "*33" and "*34"). In an alternative embodiment, the customer may program an activate and deactivate code to minimize potential for children, guests, or otherwise to activate or deactivate the wireline telephone service. Still yet, rather than having to enter a code via a telephone, the local telecommunications service provider server 202 may provide for a customer to call a interactive voice response system (not shown) being operated by the local telecommunications service provider server 202 or other computing system in communication therewith. In another embodiment, the local telecommunications service provider server 202 may enable a customer to activate and deactivate wireline telephone service via a website (not shown) that is operated by the local telecommunications service provider server 202 or capable of causing the local telecommunications service provider server 202 to activate and deactivate wireline telephone service.

Figure 3A:
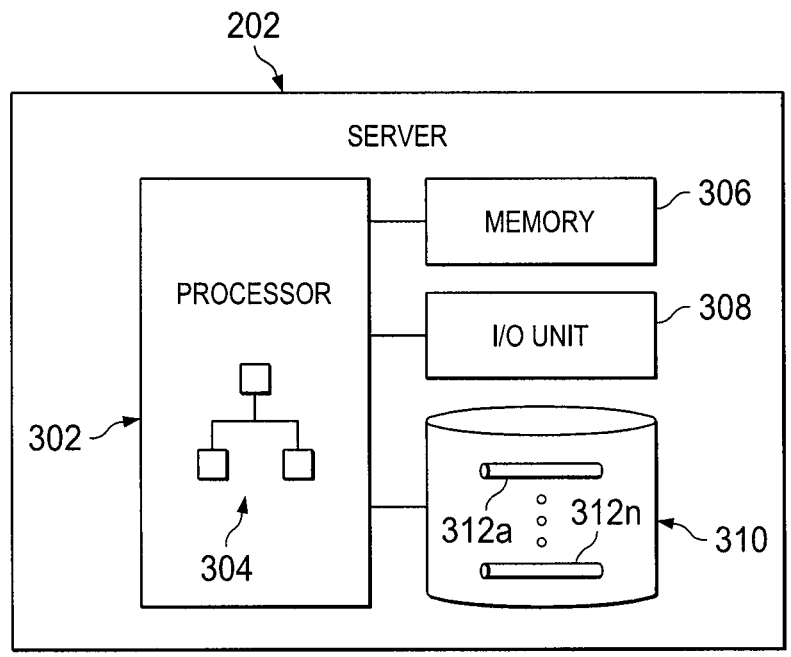
FIG. 3A is a block diagram of an exemplary server configured to manage data for providing wireline telephone services for transient customers.

FIG. 3A is a block diagram of an exemplary server 300 configured to manage data for providing wireline telephone services for transient customers. The server 300 may include a processing unit 302 that executes software 304. The software 304 may include software modules that perform functions for maintaining and managing wireline telephone service to customers. The processing unit 302 may be in communication with a memory 306, input/output (I/O) unit 308, and storage unit 310. The storage unit may store one or more data repositories 312a-312n (collectively 312) that store data about customers, including transient customers. The I/O unit 308 may communicate with the PSTN, Internet, or other network to enable a local telecommunications service provider and/or customers to manage data stored in the data repositories 312 by interacting with the software 304. Although shown as a single server 300, it should be understood that multiple servers and computing devices operated by the local telecommunications service provider may be utilized to perform the same or similar functionality as described herein. Furthermore, the data repositories 312 may be located in the same storage unit or different storage units on different locations on a network or on multiple networks.

Figure 3B:
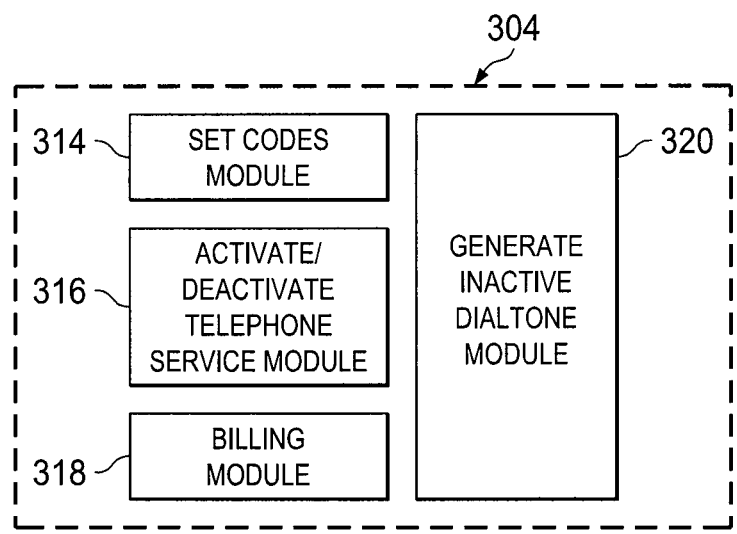
FIG. 3B is a block diagram of exemplary software modules for providing wireline telephone services for transient customers.

FIG. 3B is a block diagram of exemplary software modules 304 for providing local telecommunications services for transient customers. The software modules 304 may include a set codes module 314, activate/deactivate telephone service module 316, and billing module 318. The set codes module 314 may be configured to provide initial activate and deactivate codes for a transient customer to use to activate and deactivate wireline telephone service. In one embodiment, activate and deactivate codes may be standard and unchangeable similar to anonymous call rejection being "*77" and "*87," which activate and deactivate blocking calls with blocked caller ID. Alternatively, the set codes module 314 may provide for an initial set of activate and deactivate codes (e.g., activate "*1234" and deactivate "*4321") and allow a transient customer to change the code via an interactive voice response system, website, interactive touchtone system, or otherwise. For example, the transient customer may call an interactive voice portal and be asked a security question, such as last four digits to the transient customer's social security number, and, in response to receiving a correct answer, enable the transient customer to provide new activate and deactivate codes.

The activate/deactivate telephone service module 316 may be configured to enable a transient customer to dial the activate or deactivate code to turn on or off the wireline telephone service. In response to the activate/deactivate telephone service module 316 recognizing an activate or deactivate code, the activate/deactivate telephone service module 316 may communicate with the data repositories 312 (FIG. 3A) to set an activate date or deactivate date so that billing can be properly established during a billing cycle.

The billing module 318 may be configured to create bills for non-transient and transient customers. If a customer is denoted as a transient customer, then the billing module 318 may be configured to create the transient customer's bill based on billing rules for that customer. For example, if the transient telephone plan is defined as billing the customer for an entire month if the customer activates his or her wireline telephone service at anytime during the month, then the billing module 318 may examine data stored in the repositories for an activate date during a month and, if the transient customer has activated the wireline telephone service during a monthly billing cycle, then the billing module 318 will bill the transient customer a premium service charge for the month.

In one embodiment, the wireline telephone service may enable the transient customer to place emergency telephone calls while the wireline telephone service is inactive. Similarly, the inactive wireline telephone service may enable a transient customer to call an operator or telecommunication service provider for free or for a service charge. Being inactive does not necessarily mean that the telephone line is disconnected, but rather either prevents the transient customer from placing telephone calls or charges a significant premium on a per call basis (e.g., $3.99 minimum) for the transient customers to place the telephone calls. In essence, an inactive wireline telephone service may operate as a pay phone where charges are paid on a per-call basis and billed either through normal billing or restricted to credit card or other form of payment.

A generate inactive dialtone module 320 may be configured to alert the transient customer that the wireline telephone service is inactive. In generating the inactive dialtone, a different dialtone may be played when a telephone of the transient customer is off-hook (i.e., when the customer activates the telephone for placing a call). For example, a different pitch or frequency of the dialtone may be played. Alternatively, a discontinuous dial tone (e.g., series of tones) may be played. Still yet, an announcement may be played (e.g., "This phone is inactive. Please enter your activate code to activate the wireline telephone service."). By notifying the transient customer of the wireline telephone service being inactive, the transient customer will have limited ability to complain that he or she did not realize that the telephone service was inactive and that the bill during the inactive state should be lowered should the local telecommunications service provider enable the transient customer to place calls at a premium while the wireline telephone service is inactive.

FIG. 4 is a table of exemplary data 400 for providing wireline telephone services for transient customers. A shown, the data 400 may include a number of records 402a-402n (collectively 402). Each of the records may include a transient customer name, address, ID, activate/deactivate code, activation monthly service charge, deactivation monthly service charge, and telephone number retention rate. As previously described, the activate and deactivate codes may be established by a transient customer (e.g., "*0714" and "*0814") or local telecommunications service provider (e.g., "*22"). As shown, the activate and deactivate codes may be the same (e.g., "*22") or different (e.g., "*0714" and "*0814"). The activation monthly rate may be a premium service charge (e.g., $29.95/month) as compared to a standard monthly service charge (e.g., $19.99/month) because a deactivation monthly service charge (e.g., $1.99) may be significantly lower than a standard monthly service charge. Depending on the transient customer's travel schedule, the transient service plan may be financially attractive due to the different service charges. Because there is an inherent cost to maintaining telephone numbers for customers, the local telecommunications service provider may establish a monthly telephone number retention service charge (e.g., $2.00). If the transient customer elects not to maintain a telephone number, then a telephone number may be assigned to the transient customer when he or she activates the wireline telephone service and remove the telephone number when he or she deactivates the wireline telephone service. The table 400 may be stored in the data repositories 312 (FIG. 3A) or elsewhere.

TABLE I shows exemplary activation/deactivation data of transient customers. The activation and deactivation dates may be established by the transient customers themselves by calling into an interactive software program to activate and deactivate wireline telephone service using activate and deactivate codes (see FIG. 4). As previously described, the transient customer may be billed for an entire month or portion thereof based on the activation and deactivation dates of the wireline telephone service. It should be understood that other parameters may be maintained in TABLE I for use in billing the transient customer or for other record keeping by the local telecommunications service provider.

TABLE I

Transient Customer Activation/Deactivation Data

| Name | ID | Activate Date | Deactivate Date |
|---|---|---|---|
| Bob Smith | 02942 . . . | Sep. 2, 2006 | Mar. 1, 2007 |
| Bob Smith | 02942 . . . | Aug. 27, 2007 | Feb. 24, 2008 |
| Lisa Simpson | 27341 . . . | Nov. 17, 2006 | Apr. 18, 2007 |
| Lisa Simpson | 27341 . . . | Jul. 3, 2007 | Sep. 30, 2007 |

FIG. 5 is a timing diagram of an exemplary process 500 for enabling a subscriber to activate and deactivate wireline telephone services for transient customers. The process 500 provides for a transient customer 502 to communicate with a local telecommunications service provider 504. In one embodiment, communication with the local telecommunications service provider 504 includes communicating with an automated system being executed by a server, such as server 202 of FIGS. 2 and 3A. The communication may alternatively or additionally include communication with a human operator at the local telecommunications service provider 504. At step 506, the transient customer 502 may communicate an activate code to the local telecommunications service provider 504 to activate wireline telephone service. At step 508, the local telecommunications service provider 504 may activate the wireline telephone service and set the activation billing service charges into effect. Thereafter, the transient customer 502 may utilize the wireline telephone as normally performed.

At step 510, the transient customer 502 may communicate a deactivation code to the local telecommunications service provider 504 to deactivate the wireline telephone service. In response, the local telecommunications service provider 504 may deactivate the wireline telephone service and set the inactive billing services charges into effect. At step 514, the local telecommunications service provider 504 may communicate billing to the transient customer 502. It should be understood that billing may be communicated to the transient customer 502 on a monthly or other time frame basis and bill the transient customer 502 according to the activation and deactivation service charges established for the transient service plan.

FIG. 6 is a flow diagram of an exemplary process 600 for enabling a transient customer to activate and deactivate wireline telephone service. The process 600 starts at step 602, where wireline telephone service is provided to a residence for a customer to place telephone calls. In response to receiving an activate code, the wireline telephone service may be activated at step 604. In response to receiving a deactivate code, the wireline telephone service may be deactivated at step 606. The activate and deactivate codes may be provided by the transient customer via a telephone, website, or otherwise. At step 608, the transient customer may be billed for the wireline telephone service. In one embodiment, the transient customer is billed a premium service charge when the wireline telephone service is active and a lower service charge when the wireline telephone service is inactive. A telephone number may be maintained while the wireline telephone service is inactive by the transient customer paying a service charge. In one embodiment, the activate and deactivate codes may be established by a telecommunications service provider. The transient customer may change the activate and deactivate codes. The wireline telephone service may enable for emergency 911 calls while inactive. A distinctive dial tone may be generated for the transient customer when the wireline telephone service is inactive.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A method for providing wireline telephone services, said method comprising:
   providing wireline telephone service to a residence for a customer to place telephone calls;
   in response to receiving an activate code at a service provider system, activating, using a processor of the service provider system, the wireline telephone service;
   in response to receiving a deactivate code at the service provider system, deactivating the wireline telephone service; and
   determining whether the wireline telephone service was in an activated state during a billing cycle and in response to a determination that the wireline telephone service was in the activated state during the billing cycle, billing the customer for the wireline telephone service at a first rate;
   billing the customer for the wireline telephone service at a second rate lower than the first rate in response to a determination that the wireline telephone service was not in the activated state during the billing cycle; and
   billing the customer on a per-call basis for calls made using the wireline telephone service while the wireline telephone service is in a deactivated state; and
   further comprising generating an inactive wireline telephone service dial tone when the wireline telephone service of a transient customer is inactive and a telephone of the transient customer is off-hook.

2. The method according to claim 1, wherein billing the customer includes billing the customer a premium service charge for the wireline telephone service when activated.

3. The method according to claim 1, further comprising billing the customer a service charge to maintain a telephone number during times when the wireline telephone service is deactivated.

4. The method according to claim 1, further comprising billing the customer a service charge during times when the wireline telephone service is deactivated that is less than a service charge during times when the wireline telephone service is activated.

5. The method according to claim 1, wherein receiving activate and deactivate codes includes receiving activate and deactivate codes established by a telecommunications service provider.

6. The method according to claim 1, further comprising:
   receiving the activate and deactivate codes from a customer; and
   storing the activate and deactivate codes for use in determining whether to activate and deactivate the wireline telephone service.

7. The method according to claim 1, wherein the activate and deactivate codes are the same.

8. The method according to claim 1, wherein deactivating the wireline telephone services includes preventing a user from placing calls with the exception of calling 911.

9. The method according to claim 1, further comprising assigning a temporary telephone number to the residence during times that the wireline telephone service is active unless the customer pays a service charge to maintain a telephone number at the residence.

10. A system for providing wireline telephone services, said system comprising:
    a server including a processing unit, input/output unit, and storage unit, the processing unit executing software configured to:
    provide wireline telephone service to a residence for a customer to place telephone calls;
    in response to receiving an activate code, activate the wireline telephone service;
    in response to receiving a deactivate code, deactivate the wireline telephone service;
    determine whether the wireline telephone service was in an activated state during a billing cycle;
    in response to a determination that the wireline telephone service was in the activated state during the billing cycle, billing the customer for the wireline telephone service at a first rate; and
    in response to a determination that the wireline telephone service was not in the activated state during the billing cycle, billing the customer for the wireline telephone service at a second rate lower than the first rate; and
    bill the customer on a per-call basis for calls made using the wireline telephone service while the wireline telephone service is in a deactivated state; and
    wherein the software is further configured to generate an inactive wireline telephone service dial tone when the wireline telephone service of a transient customer is inactive and a telephone of the transient customer is off-hook.

11. The system according to claim 10, wherein the software is further configured to bill the customer a premium service charge for the wireline telephone service when active.

12. The system according to claim 10, wherein the software is further configured to activate the wireline telephone service in response to receiving the activate code via a telephone at the residence.

13. The system according to claim 10, wherein the software is further configured to bill the customer a service charge to maintain a telephone number during times when the wireline telephone service is inactive.

14. The system according to claim 10, wherein the activate and deactivate codes are established by a telecommunications service provider.

15. The system according to claim 10, wherein the storage unit is configured to store the activate and deactivate codes for use in determining whether to activate and deactivate the wireline telephone service.

16. The system according to claim 10, wherein the software is further configured to prevent a user from placing calls with the exception of calling 911 when the wireline telephone service is inactive.

17. The system according to claim 10, further comprising assigning a temporary telephone number to the residence during times that the wireline telephone service is active unless the customer pays a service charge to maintain a telephone number at the residence.

* * * * *